Patented Jan. 29, 1935

1,989,480

UNITED STATES PATENT OFFICE 1,989,480

PROCESS OF PREPARING CEREAL FOODS

John L. Kellogg, Chicago, Ill., assignor, by mesne assignments, to Associated Patents, Inc., Kalamazoo, Mich., a corporation of Delaware No Drawing. Application June 27, 1932, Serial No. 619,610

27 Claims. (Cl. 99—10)

This invention relates to a process of preparing cereal grains for use as ready cooked cereal or breakfast foods to the end that the grain may be in an ideal condition for ready digestion.

Heretofore various cereal grains have been cooked in a steam or other similar cooker and, after removing the same from the cooker, the grains have been subjected to mechanical treatment, such as flaking or shredding, whereby the form of the grains is changed, being converted into flakes or shreds. In most cases the entire grain has been so treated, whereas in other cases it has been proposed to treat only a portion of the grain, such for example as the bran of wheat with a portion of the grain of the wheat immediately under the bran, some the the interior starch portion being eliminated.

In these mechanical treatments it has been the practice to first partially dry the grains after they leave the cooker and then to subject the partially dried grains to what is technically known as "tempering" that is, to permit the grains to stand for a considerable length of time in a vat or other container until the interior moisture in the partially dried grains has been uniformly distributed throughout the grains. This leaves the grains in a tough, leathery condition and has been deemed necessary in order to prevent the grains from being disintegrated or assuming a mushy condition upon being treated by the flaking rolls or shredder. After being flaked or shredded, the grains have been subjected to a roasting temperature in suitable ovens where they are more or less browned, and in some instances puffed. This puffing step is particularly desirable because it places the grains in a light, crispy condition and also serves to dextrinize the starches of the grains.

I have discovered that it is not necessary to dry and temper the grains before the same are subjected to mechanical treatment, as by rolling or shredding, if the rolls or shredding machines are hot, and I, therefore, according to the present invention, cook the grains in any suitable cooker, such for example as a steam cooker at fifteen pounds pressure, and then pass the grains directly from the cooker to hot rolls or shredding machines for changing the form of the grains, while the grains are still hot, i. e., in the condition in which they come from the cooker, care being taken to feed the grains to the rolls or shredder so that they will be presented thereto in separate grains rather than in adhering masses of grains. Preferably the grains are passed from the cooker to the machines by a suitable conveyor, care being taken to so supply the grains to the conveyor that they will reach the rolling or shredding machines while hot and as individual grains. In other words, the grains are not allowed to cool and are not passed through the conveyor en masse. Any suitable conveyor for accomplishing this result may be employed.

The form of the grains may be readily changed, as by rolling them individually or shredding them in this manner without the necessity of first resorting to the drying and tempering steps indicated above. After the grains have been rolled or shredded, they are then partially dried until the moisture content is from ten to fifteen percent, varying somewhat with the different kinds of grains, such as wheat, rice, oats, corn, etc., under treatment. After the rolled or shredded grains are thus partially dried, they are preferably, though not necessarily tempered and are then provided with a moisture-occluding coating. Preferably they are treated with a solution or a fluid or semi-fluid preparation of such character that when the grains are again partially dried, there will be left on the exterior of the rolled particles or shreds a moisture-occluding substance tending to confine the moisture that is within the grain, so that when the grains are subjected to a high temperature the moisture within the rolled particles or shreds will be first converted into steam but, by reason of the moisture-occluding coating will be confined therein, with the result that this pressure puffs or expands the rolled particles or shreds until the pressure reaches a point where it finally breaks out through little puffs or otherwise, and escapes. While other moisture-occluding preparations, such as solutions containing a small per cent of egg albumen or starchy material, may be employed, I prefer to spray the rolled particles or shreds with a solution of salt and sugar prepared in the proportion of twenty parts water to two and one-half parts salt and from three to five parts sugar. This solution is preferred because, when the moisture is dried from the solution, the salt and sugar remaining on the rolled grains or shreds not only serve as means for occluding the moisture within the rolled grains or shreds, but also materially add to the flavor of the finished product. After spraying this flavoring solution upon the rolled or shredded grains, the same are partially redried until the moisture content thereof is from ten to fifteen per cent. After this second partial drying step the coated particles or shreds are tempered, i. e., allowed to stand in bulk until the moisture content thereof is uniformly distributed through each rolled particle or shred. The tempered, rolled or shredded grains are then passed to a suitable oven where they are subjected to a high temperature of from 325 to 600° F., the temperature, as well as the time during which the rolled particles or shreds are subjected to such temperature, varying with the grain under treatment and the particular result to be secured. In some cases, the temperature and time of treatment is such as to produce a toasting or browning of the product to a rich, toast-like brown, whereas in other cases, the treatment is continued only to the point of very lightly browning the product and converting the moisture content into steam to produce the puffing action desired.

In the treatment of wheat, for example, it will be found that when the wheat grains are passed, while still hot, directly from the cooker to the hot rolls, the result will be a disk indented in the center and turned up around the edges in the form of a cup. This lends itself to ready partial drying, and when the same has been subjected to the action of the toasting oven, the cup-shaped particle is puffed to a greatly increased size, very tender and palatable.

If desired, certain grains, such for example as rice, may be partially dried immediately after leaving the cooker and without rolling or shredding and then sprayed with the flavoring or other moisture-occluding solution, again partially dried, or redried, to a moisture content of from ten to fifteen per cent, and then tempered and subjected to a toasting temperature in an oven. This produces a highly-puffed, delightfully-crisp, dextrinized cereal food. Other grains, such as wheat, may be passed while hot directly to the hot rolls, then partially dried, and then sprayed or otherwise treated with the flavoring or other solution of an edible substance, redried to a moisture content of from ten to fifteen per cent, tempered and then puffed in an oven.

The cereals prepared as herein described are highly palatable and eaten with milk or cream. They do not become mushy, but remain crisp and tender. If desired however they may be served as a hot breakfast food by immersing for a few minutes in hot water and then draining off the water or they may be served with milk.

When the grains are to be rolled or shredded or otherwise subjected to mechanical treatment, the essential step according to the present invention, consists in subjecting them to such treatment immediately upon issuing from the cooker and while still hot and in the condition in which they leave the cooker; and whether the grains are subjected to mechanical treatment or not, the further steps consist in partially drying and then treating the grains or rolled particles or shreds to a moisture-occluding solution, again partially drying and then tempering the same and then subjecting them to a high temperature, with the result that the grains, rolled particles or shreds are highly puffed and thus rendered delightfully crisp and tender. Any suitable means for putting these steps in practice; any suitable occluding solution; as well as any suitable means for subjecting the grains, rolled particles, or shreds to the proper temperature for puffing the same may be employed without departing from the spirit of the invention, the limits of which are defined in the accompanying claims.

What is claimed is:

1. The process of treating cereal grains which consists in cooking the same in the presence of moisture, mechanically treating the grains while still moist and hot to change their form, then partially drying the same, then coating the partially dried deformed grains with a moisture-occluding substance, then tempering the coated grains, and then subjecting the same to a high temperature, whereby they are puffed.

2. The process of treating cereal grains which consists in cooking the same in the presence of moisture, then mechanically treating the same while still moist and hot to change their form, then partially drying the same, then moistening the grains with a moisture-occluding solution and partially redrying the same whereby a moisture-occluding coating is left thereon, then tempering the coated grains, and then subjecting the same to a high temperature, whereby a puffed product is secured.

3. The process of treating cereal grains which consists in cooking the same in the presence of moisture, then rolling the grains while still moist and hot, then partially drying the rolled grains, then coating the rolled grains with a moisture-occluding substance, then further drying the grains to fix the moisture occluding substance, and then puffing the grains by exposing them to a high temperature.

4. The process of treating cereal grains which consists in cooking the same in the presence of moisture, then rolling the grains while still moist and hot, then partially drying the rolled grains, then treating the partially dried grains with a moisture-occluding solution and again partially drying the grains, whereby the same are covered with a moisture-occluding coating, and then puffing the grains by exposing them to a high temperature 5. The process of treating cereal grains which consists in cooking the same in the presence of moisture, then rolling the grains while still moist and hot, then partially drying the rolled grains, then treating the grains with a flavoring solution and again partially drying the grains, whereby the grains are covered with a flavoring and moisture-occluding coating, and then subjecting the partially dried grains to a high temperature, whereby the same are puffed.

6. The process of treating cereal grains which consists in steam-cooking the same, then mechanically changing the form of the grains while still moist and hot, then partially drying the same, then treating the deformed grains with a flavoring solution and again partially drying the same to fix the flavoring solution, and then subjecting them to a high temperature, whereby they are puffed.

7. The process of treating wheat, which consists in cooking the wheat in the presence of moisture, then passing the grains in the condition in which they come from the cooker and while still moist and hot through a rolling machine, whereby the same are formed into cup-shaped particles, then partially drying said particles, then covering the same with a moisture-occluding coating, then tempering the particles and then subjecting the coated and tempered particles to a high temperature, whereby they are puffed.

8. The process of treating cereal grains which consists in steam-cooking the same at a pressure of approximately fifteen pounds, passing the same while still hot and moist to hot rolls, then drying the rolled product to a moisture content of approximately ten to fifteen per cent, coating the partially dried rolled grains with a flavoring solution and further drying the same to fix the flavoring solution, and then subjecting them to a high temperature to puff the same.

9. The process of treating wheat which consists in steam-cooking the same at a pressure of approximately fifteen pounds, passing the same while hot and moist to hot rolls, then drying the rolled product to a moisture content of approximately ten to fifteen per cent, treating the partially dried rolled grains with a sugar and salt solution, further drying the same, then tempering them, and then subjecting them to a high temperature to puff the same.

10. The process which consists in cooking cereal grains in the presence of moisture, mechanically treating the grains while still moist and hot to change their form, coating the same with a moisture-occluding substance, then drying the grains to fix the moisture-occluding substance, then tempering the grains, and subjecting them to a high temperature, whereby they are puffed.

11. In a process for treating a moisture-containing cereal grain which includes the step of subjecting the grain to a temperature whereby the grain is puffed and browned, the steps of providing the grain prior to the toasting step with a pore-closing, moisture-occluding coating, including a small per cent of egg albumen and then drying the solution, whereby the evaporation of moisture and the escape of steam from within the grain is prevented during toasting until sufficient pressure is produced within the grain to explode the starch cells thereof.

12. The process of treating a cereal grain which consists in steam cooking the grain, then rolling the same while still moist and hot, then partially drying the same, then supplying the same with a pore-closing coating, and further drying the grain, then tempering the grain and then subjecting the same to a toasting temperature, whereby the particles are puffed and browned.

13. The process of treating a cereal grain which consists in steam cooking the grain, then rolling the same while hot and in the condition in which it comes from the cooker, then covering the same with a pore-closing coating and drying the coating to harden the same, then tempering the coated rolled grains, and then subjecting the same to a toasting temperature, whereby the particles are puffed and browned.

14. The process of treating a cereal grain which consists in steam cooking the grain, then rolling the grain while hot and in the condition in which it comes from the cooker, then partially drying the rolled grain, then encasing the partially dried grains in a moisture-occluding coating, then tempering the coated grains, and then subjecting the same to a toasting temperature to puff and brown the same.

15. The process of treating a cereal grain which consists in steam cooking the grain, then rolling the same while hot and in the condition in which it comes from the cooker, then spraying the same with a pore-closing solution, then evaporating the moisture from said solution, whereby the grain is provided with a moisture-occluding coating, then tempering the coated grain, and then subjecting the grain to a toasting temperature, whereby the particles are puffed and browned.

16. The process of treating a cereal grain which consists in cooking the grain in the presence of moisture, then mechanically treating the grain while still moist and hot to change its form, then partially drying and tempering the same, then moistening the partially dried and tempered grain with a moisture-occluding solution and partially redrying the same whereby a moisture-occluding coating is left thereon, then tempering the coated grains, and then subjecting the same to a high temperature whereby a puffed product is secured.

17. The process of treating cereal grains which consists in cooking the grains in the presence of moisture, then rolling the grains while still moist and hot whereby the individual grains are rendered cup-shaped, then partially drying the same, then covering the cup-shaped grains with a coating of an edible substance, then further drying the grains to fix the coating, then tempering the same, and then puffing the grains by exposing them to a high temperature.

18. The process of making ready-to-eat cereal foods which consists in cooking cereal grains in the presence of moisture, then rolling the grains while still moist and hot to render the individual grains cup-shaped, then partially drying the rolled grains, then coating the grains with a flavoring solution of a starchy substance, then further drying the grains to fix the coating, and then puffing the same by exposing them to a high temperature.

19. The process of making a ready-to-eat cereal food which consists of cooking wheat in the presence of moisture, then rolling the grains of wheat while still moist and hot whereby they are individually rendered cup-shaped, then partially drying the grains, then covering the grains with a flavoring solution containing sugar, then further drying the grains and tempering the same, and subjecting the tempered grains to a high temperature to puff the same.

20. The process of making a ready-to-eat cereal food which consists in steam-cooking wheat at a pressure of approximately 15 pounds, rolling the same while still hot and moist, drying the rolled product to a moisture content of approximately 10 to 15%, covering the rolled grains with an edible coating fluid, further drying the grains to harden the coating, and then subjecting the grains to a high temperature to puff the same.

21. The process of making a ready-to-eat cereal food which consists in steam-cooking wheat at a pressure of approximately 15 pounds, rolling the same while still hot and moist, then drying the rolled product to a moisture content of approximately 10 to 15%, covering the wheat grains with a sugar solution, further drying the grains to harden the sugar solution, then tempering the grains and then subjecting them to a high temperature to puff the same.

22. The process of making a ready-to-eat cereal food which consists in cooking kernels of wheat in moisture, rolling the wheat kernels individually while still moist and hot, partially drying the kernels, coating the kernels with a solution containing sugar, further drying the kernels to harden the coating; tempering the kernels, and then subjecting them to a toasting temperature whereby they are puffed.

23. The process of treating cereal grains, which comprises cooking the grains in the presence of moisture, then partially drying the grains, then coating the cooked grains solely with a non-fatty edible substance in fluid form, drying the grain sufficiently to fix the coating, and puffing the grains to greatly increased size by exposing them to heat.

24. The process of treating cereal grains, which comprises cooking the grains in the presence of moisture, partially drying the grains, then coating the grains solely with a solution of a non-fatty edible substance, drying the grains sufficiently to evaporate the solvent and harden the coating, and then puffing the grains to greatly increased size by exposing them to heat.

25. The process of treating cereal grains, which comprises cooking the grains in the presence of moisture, rolling the cooked grains while still moist and hot, partially drying the rolled grains, coating the rolled grains with a solution of an edible substance, then drying the grains sufficiently to evaporate the solvent and fix the coating, and then puffing the coated grains by exposing the same to a high temperature.

26. The process of making a ready-to-eat cereal food, which consists in cooking cereal grains in the presence of moisture, rolling the cooked grains while moist and hot, partially drying the rolled grains, coating the grains with a flavoring solution of a starchy substance, further drying the grains to fix the coating, and puffing the same by exposing them to a high temperature.

27. The process of treating cereal grains, comprising cooking the grains in the presence of moisture, then mechanically changing the form of the grains while moist and hot, then treating the deformed grains with a flavoring solution and again drying the grains sufficiently to fix the solution, and then subjecting the grains to heat to puff the same.

JOHN L. KELLOGG.